United States Patent
Nakajima

(10) Patent No.: US 9,042,270 B2
(45) Date of Patent: May 26, 2015

(54) METHOD AND APPARATUS OF NETWORK CONFIGURATION FOR STORAGE FEDERATION

(71) Applicant: Akio Nakajima, Santa Clara, CA (US)

(72) Inventor: Akio Nakajima, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 296 days.

(21) Appl. No.: 13/720,129

(22) Filed: Dec. 19, 2012

(65) Prior Publication Data

US 2014/0169214 A1 Jun. 19, 2014

(51) Int. Cl.
*H04L 12/28* (2006.01)
*H04L 12/24* (2006.01)

(52) U.S. Cl.
CPC ..................................... *H04L 41/12* (2013.01)

(58) Field of Classification Search
CPC ........................................................ H04L 3/24
USPC ................................................. 370/398–474
See application file for complete search history.

(56) References Cited

U.S. PATENT DOCUMENTS

| | | | | |
|---|---|---|---|---|
| 2007/0079092 | A1* | 4/2007 | Hara et al. | 711/163 |
| 2011/0106923 | A1* | 5/2011 | Bethune et al. | 709/221 |
| 2011/0299525 | A1 | 12/2011 | Peterson | |
| 2012/0066468 | A1* | 3/2012 | Nakajima et al. | 711/165 |

OTHER PUBLICATIONS http://www.t11.org/ftp/t11/pub/fc/ifr/10-138v0.pdf: INCITES/ANSI T11, Inter fabric routing, (Rev 1.06, May 2010).

* cited by examiner

*Primary Examiner* — Iqbal Zaidi
(74) *Attorney, Agent, or Firm* — Mattingly & Malur, PC

(57) ABSTRACT

A computer comprises a memory, and a controller operable to: manage, using the memory, a first relationship among a plurality of ports of Fiber Channel protocol and a volume used to store data to be sent via the ports, and a second relationship between each of the ports and a fabric identification of a fabric topology; manage use of the ports for creating a same fabric zone if the ports correspond to same fabric identification based on the second relationship; and manage use of (1) a first port of the plurality of ports as a first proxy port in a second fabric zone and (2) a second port of the plurality of ports as a second proxy port in a first fabric zone, for interconnecting the first fabric zone and the second fabric zone, if the ports do not correspond to the same fabric identification based on the second relationship.

20 Claims, 16 Drawing Sheets

Volume Pair and port configuration table 60

| Type | local volume ID | local WWPN | remote volume ID | remote WWPN |
|---|---|---|---|---|
| Active-Active | Storage A Volume ID 0000 | Storage A Port SA | Storage B Volume ID 000a | Storage B Port SB |
| Async Copy | Storage A Volume ID 0001 | Storage A Port AA | Storage B Volume ID 000b | Storage B Port BB |
| migration | Storage A Volume ID 0002 | Storage A Port AA | Storage B Volume ID 000c | Storage B Port SB |
| ... | ... | ... | ... | ... |

Fabric topology table 70

| N_Port | Switch WWN | Switch Type | Fabric WWN/ID |
|---|---|---|---|
| Storage A Port 0 | FC Switch A | Principal (fabric WWN) | FC Switch A Fabric ID 01 |
| Storage A Port 1 | FC Switch B | Subordinal | FC Switch A Fabric ID 01 |
| Server A Port 0 | FC Switch B | Subordinal | FC Switch A Fabric ID 01 |
| N/A | FC Switch C | FC Router | FC Switch A Fabric ID 01 |
| ... | ... | ... | ... |

| Host Group table 110 | | |
|---|---|---|
| Host WWPN ~1101 | volume ID ~1102 | Storage WWPN ~1103 |
| Host A Port HA | Storage B Volume ID 000a | Storage B Port SB |
| ... | ... | ... |

FIG 11.

| Host Cluster table 150 | | |
|---|---|---|
| Cluster ID 1501 | Phys WWPN list 1502 | Virtual WWPN list 1503 |
| 1 | Host Port HA | ~~VM port 1~~<br>VM port 2 ... 1504 |
| 1 | Host Port HB | VM port 1<br>VM port 3 ... |
| ... | ... | ... |

FIG 15.

METHOD AND APPARATUS OF NETWORK CONFIGURATION FOR STORAGE FEDERATION

BACKGROUND OF THE INVENTION

The present invention relates generally to computer systems, storage networking, and interface protocol and server/storage migration technology and, more particularly, automation of storage network configuration.

FC (Fibre Channel) router specification is available to connect local SAN (Storage Area Network) fabric and remote SAN fabric to separate network failure boundary. A FC router separates local SAN fabric and remote SAN fabric, so that there is no propagation of a topology change message or the like from one SAN to another SAN via the FC router. For large SAN fabrics that are built at each of a plurality of sites, if a site causes network failure or there is failure of FC router connection path, then the FC router deletes proxy N_Port only, so that fabric topology does not change and impact of network failure is limited.

Storage area network configuration between remote sites is difficult since FC router zoning (inter fabric router zoning) is required to configure each of the FC routers and coordination among multiple sites is required.

BRIEF SUMMARY OF THE INVENTION

Exemplary embodiments of the invention provide a way to achieve automation of storage network configuration, more specifically SAN configuration, in cases of storage volume migration or server virtual machine migration, either via FC router or not via FC router. Embodiments of the invention provide a storage program that obtains topology information and fabric identifier information. The storage program at the local storage and the storage program at the remote storage create inter fabric router zoning to communicate between local storage and remote storage via FC router, or between local host and remote storage via FC router.

In accordance with an aspect of the present invention, a computer comprises a memory, and a controller operable to: manage, using the memory, a first relationship among a plurality of ports of Fibre Channel (FC) protocol and a volume used to store data to be sent via the plurality of ports, and a second relationship between each of the ports and a fabric identification of a fabric topology; manage use of the plurality of ports for creating a same fabric zone if the plurality of ports correspond to the same fabric identification based on the second relationship; and manage use of (1) a first port of the plurality of ports as a first proxy port in a second fabric zone and (2) a second port of the plurality of ports as a second proxy port in a first fabric zone, for interconnecting the first fabric zone and the second fabric zone, if the plurality of ports do not correspond to the same fabric identification based on the second relationship.

In some embodiments, if the plurality of ports correspond to the same fabric identification, the controller is operable to manage use of the plurality of ports for creating the same fabric zone, for access to the volume, based on the first and second relationships; and if the plurality of ports do not correspond to the same fabric identification, the controller is operable to manage use of (1) the first port and (2) the second port, for interconnecting the first fabric zone and the second fabric zone, for access to the volume, based on the first and second relationships.

In specific embodiments, the first and second ports do not correspond to the same fabric identification, the first port corresponding to a first fabric identification of a first fabric, the second port corresponding to a second fabric identification of a second fabric. If the computer is a management computer, the controller is operable to create a first inter fabric router zone as the first fabric zone in the first fabric and a second inter fabric router zone as the second fabric zone in the second fabric, the first inter fabric router zone allowing communication between the second proxy port and the first port, the second inter fabric router zone allowing communication between the first proxy port and the second port, the second proxy port communicating with the first proxy port via a connection between a first FC router of the first fabric and a second FC router of the second fabric. If a storage system comprises the computer, the controller is operable to create a first inter fabric router zone as the first fabric zone in the first fabric, the first inter fabric router zone allowing communication between the second proxy port and the first port, the second proxy port communicating with the first proxy port via a connection between a first FC router of the first fabric and a second FC router of the second fabric.

In some embodiments, the first port is a port of a first storage system; the second port is a second storage system; and the controller is operable to manage use of (1) the first port and (2) the second port, for interconnecting the first fabric zone and the second fabric zone, for access to the volume, based on the first and second relationships. In some other embodiments, the first port is a port of a storage system; the second port is a port of a host computer; and the controller is operable to: manage, using the memory, a third relationship between the volume and at least one port of a host computer for accessing the volume; and manage use of (1) the first port and (2) the second port, for interconnecting the first fabric zone and the second fabric zone, for access to the volume, based on the first, second, and third relationships. In yet other embodiments, the first port is a port of a first storage system; the second port is a virtual machine port of a virtual machine; and the controller is operable to manage, using the memory, a third relationship between physical WWPNs of (World Wide Port Names) of host computers, cluster identifier of the host computers, and virtual WWPNs of virtual machines in the host computers, and to determine, based on the third relationship, whether the virtual machine has migrated from a first host computer having a port corresponding to the first fabric identification of the first fabric to a second host computer. If the virtual machine has migrated to the second host computer and if the first and second ports correspond to the same fabric identification, the controller is operable to manage use of the first and second ports for creating the same fabric zone, for access to the volume, based on the first and second relationships. If the virtual machine has migrated to the second host computer and if the first and second ports do not correspond to the same fabric identification, the controller is operable to manage use of (1) the first port and (2) the second port, for interconnecting the first fabric zone and the second fabric zone, for access to the volume, based on the first and second relationships.

In specific embodiments, the virtual machine has migrated from the first host computer to the second host computer, and the second port corresponds to a second fabric identification of a second fabric after migration of the virtual machine. If the computer is a management computer, the controller is operable to create a first inter fabric router zone in the first fabric and a second inter fabric router zone in the second fabric, the first inter fabric router zone allowing communication between the second proxy port and the first port, the second inter fabric router zone allowing communication between the first proxy port and the second port, the second proxy port communicating with the first proxy port via a connection between a first FC router of the first fabric and a second FC router of the second fabric. If the first storage system comprises the computer, the controller is operable to create a first inter fabric router zone in the first fabric, the first inter fabric router zone allowing communication between the second proxy port and the first port, the second proxy port communicating with the first proxy port via a connection between a first FC router of the first fabric and a second FC router of the second fabric.

In accordance with another aspect of the invention, a system comprises: a computer including a memory and a controller; and a plurality of subsystems having a plurality of ports of Fibre Channel (FC) protocol and a volume used to store data to be sent via the plurality of ports. The controller is operable to: manage, using the memory, a first relationship among the plurality of ports and the volume, and a second relationship between each of the ports and a fabric identification of a fabric topology; manage use of the plurality of ports for creating a same fabric zone if the plurality of ports correspond to the same fabric identification based on the second relationship; and manage use of (1) a first port of the plurality of ports as a first proxy port in a second fabric zone and (2) a second port of the plurality of ports as a second proxy port in a first fabric zone, for interconnecting the first fabric zone and the second fabric zone, if the plurality of ports do not correspond to the same fabric identification based on the second relationship.

In some embodiments, the first port is a port of a first storage system; the second port is a second storage system; the controller is operable to manage use of (1) the first port and (2) the second port, for interconnecting the first fabric zone and the second fabric zone, for access to the volume, based on the first and second relationships; the first storage system includes a first computer having one memory as a first memory and one controller as a first controller; and the second storage system includes a second computer having another memory as a second memory and another controller as a second controller. In some other embodiments, the first port is a port of a first storage system; the second port is a port of a second host computer; the controller is operable to: manage, using the memory, a third relationship between the volume and at least one port of a host computer for accessing the volume; and manage use of (1) the first port and (2) the second port, for interconnecting the first fabric zone and the second fabric zone, for access to the volume, based on the first, second, and third relationships; the first storage system includes a first computer having one memory as a first memory and one controller as a first controller; and the system further comprises a second storage system which includes a second computer having another memory as a second memory and another controller as a second controller, the second storage system having a port which corresponds to the second fabric identification of the second fabric.

In specific embodiments, the virtual machine has migrated from the first host computer to the second host computer, and the second port corresponds to a second fabric WWN of a second fabric after migration of the virtual machine; the first storage system includes a first computer having one memory as a first memory and one controller as a first controller; the subsystems comprise a second storage system which includes a second computer having another memory as a second memory and another controller as a second controller, the second storage system having a port which corresponds to the second fabric identification of the second fabric; the first controller is operable to create a first inter fabric router zone in the first fabric, the first inter fabric router zone allowing communication between the second proxy port and the first port, the second proxy port communicating with the first proxy port via a connection between a first FC router of the first fabric and a second FC router of the second fabric; and the first controller is operable to create a second inter fabric router zone in the second fabric, the second inter fabric router zone allowing communication between the first proxy port and the second port.

Another aspect of this invention is directed to a computer-readable storage medium storing a plurality of instructions for controlling a data processor to manage network configuration. The plurality of instructions comprise: instructions that cause the data processor to manage, using the memory, a first relationship among a plurality of ports of Fibre Channel (FC) protocol and a volume used to store data to be sent via the plurality of ports, and a second relationship between each of the ports and a fabric identification of a fabric topology; instructions that cause the data processor to manage use of the plurality of ports for creating a same fabric zone if the plurality of ports correspond to the same fabric identification based on the second relationship; and instructions that cause the data processor to manage use of (1) a first port of the plurality of ports as a first proxy port in a second fabric zone and (2) a second port of the plurality of ports as a second proxy port in a first fabric zone, for interconnecting the first fabric zone and the second fabric zone, if the plurality of ports do not correspond to the same fabric identification based on the second relationship.

These and other features and advantages of the present invention will become apparent to those of ordinary skill in the art in view of the following detailed description of the specific embodiments.

BRIEF DESCRIPTION OF THE DRAWINGS

FIG. 6 shows an example of a volume pair and port configuration table.

FIG. 7 shows an example of a fabric topology table.

FIG. 11 shows an example of a host group table.

FIG. 15 shows an example of a host cluster table.

DETAILED DESCRIPTION OF THE INVENTION

Figure 1:
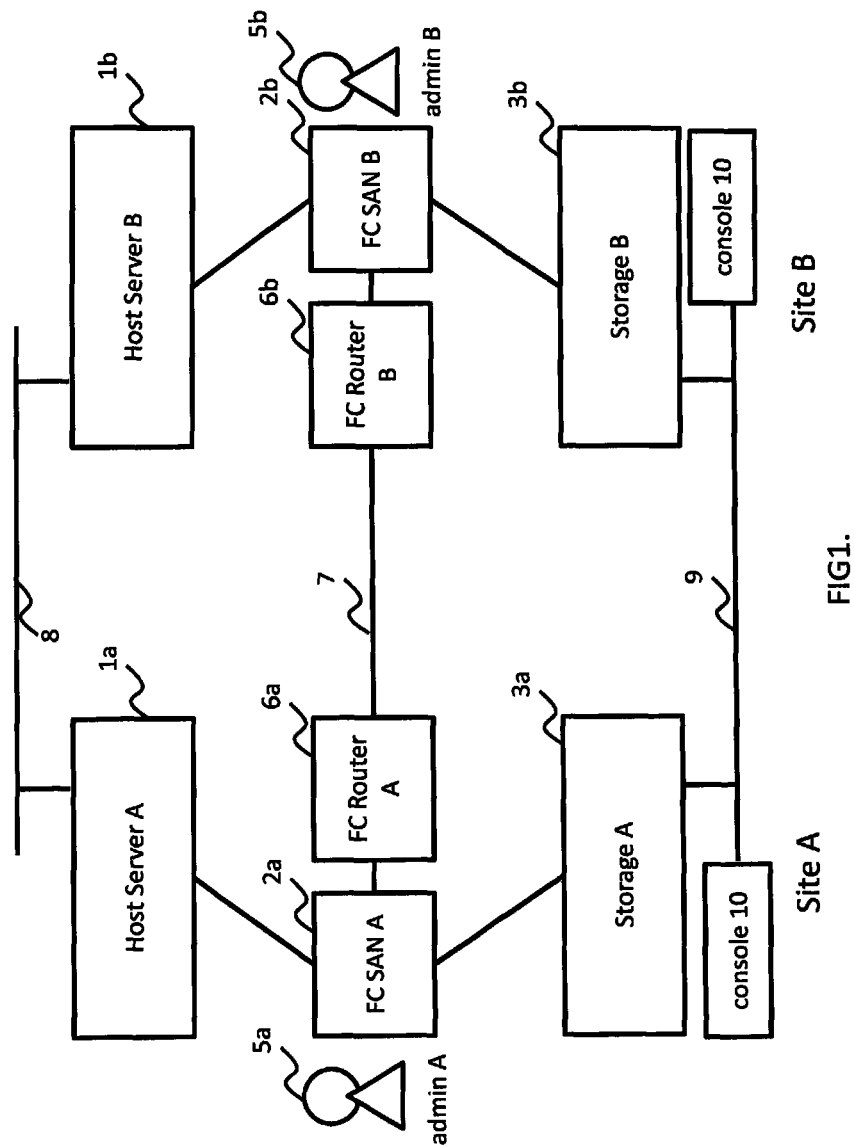
FIG. 1 shows an example of a two storage area network (SAN) environment.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for automation of storage network configuration.

FIG. 1 shows an example of a two storage area network (SAN) environment. The environment or configuration includes two sites. Each site has host server 1a (1b), FC SAN 2a (2b), storage system 3a (3b), site administrator 5a (5b), FC router 6a (6b), and inter-site connection 7. The host server 1 contains CPU, memory, and FC port. The storage system 3 contains CPU, memory, storage space, and FC port. The connection between the FC SAN 2 and host server 1 and the storage 3 or the connection between the FC SAN 2 and host server 1 and the FC Router 6 is a Fibre Channel or FCoE interconnect. An inter-site connection 7 between FC Routers 6a and 6b connects Fibre Channel, Dark Fibre, WDM (Wave Division Multiplexing), or FC over IP (Internet Protocol).

Each FC router 6a or 6b separates two FC SANs 2a and 2b, and hence separates SAN failure beyond another SAN. Each FC router 6 has a special zoning feature known as the inter fabric router zoning (IFR Zone). Each FC router 6 has a routing capability of another SAN fabric. Each FC router identifies FC fabric ID (identifier) which is identified as SAN A 2a and SAN B 2b in FIG. 1. Each FC router 6 modifies the FC Frame to encapsulate inter fabric routing FC extended Frame Header which includes the fabric ID. When both admins 5a and 5b setup IFR Zone at both sites of FC SAN, the host server 1a of site A can access the storage 3b of another site B. To optimize long distance transfer, an extender connects between the FC routers 6 of the sites, if needed. The host server 1 of each site connects to a virtual machine network 8 to move virtual machine. The storage 3 of each site connects to a management network 9 to configure disaster recovery or active-active. A management console 10 of each site is connected to the management network 9.

Figure 2:
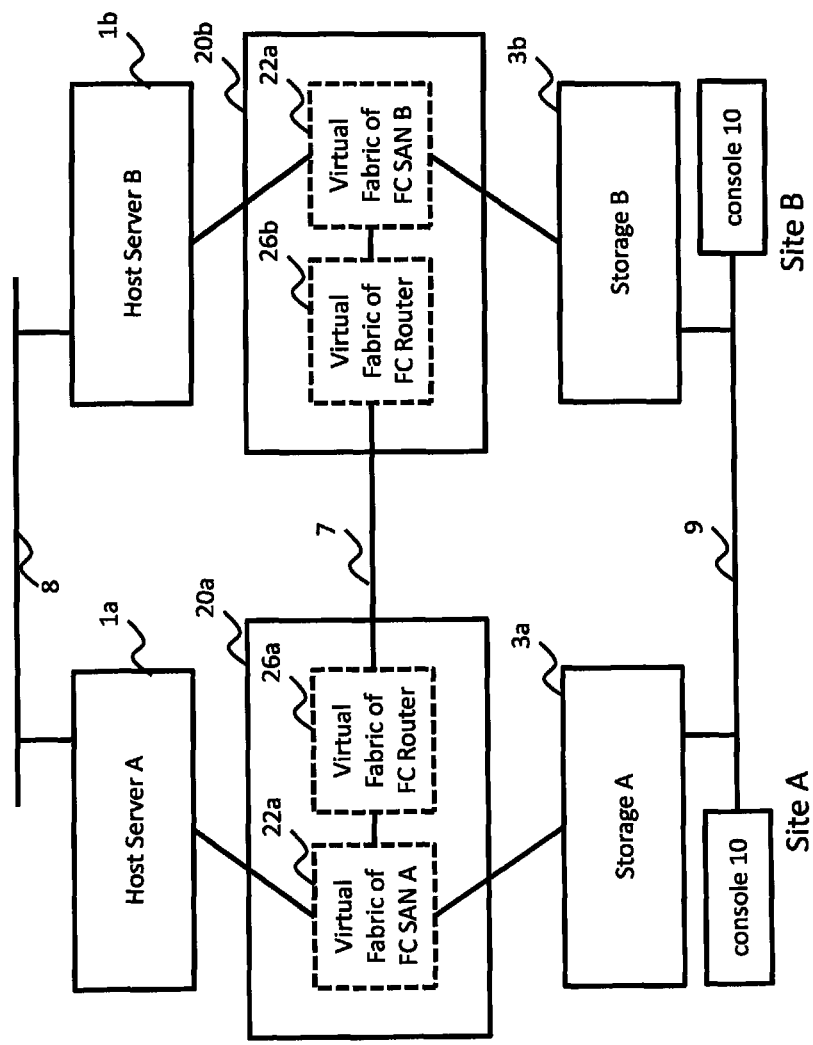
FIG. 2 shows another example of a two storage area network (SAN) environment.

FIG. 2 shows another example of a two storage area network (SAN) environment. Unlike the example in FIG. 1, each SAN 20 includes virtual fabric of FC SAN 22 and virtual fabric of FC Router 26. A virtual fabric is logical network of FCs. In contrast, each SAN 20 is physical network of FCs.

Figure 3:
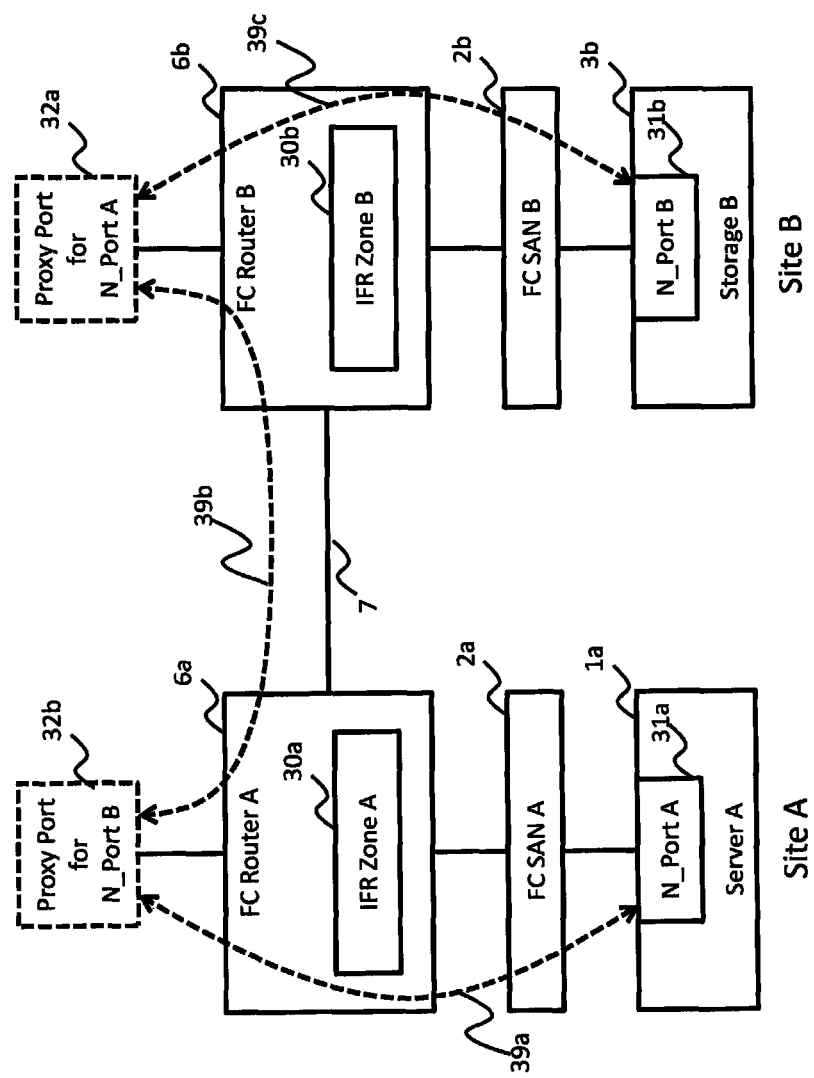
FIG. 3 shows an example of an inter fabric router zone (IFR zone).

FIG. 3 shows an example of an inter fabric router zone (IFR zone). The IFR zone configuration is required for both FC routers of both sites. When the IFR zone A 30*a* of SAN A of site A is configured, the storage B's FC Node Port (N_Port) 31*b* is exported to FC router A 6*a* as a proxy port for N_Port B 32*b*. Then IFR zone A allows communication between the proxy port for N_Port B 32*b* and the native (not proxy) N_Port A 31*a* of the server A 1*a* (see dashed line routing path 39*a*). Also, when the IFR zone B 30*b* of SAN B of site B is configured, the server A's FC Node Port (N_Port) 31*a* is exported to FC router B 6*b* as a proxy port for N_Port A 32*a*. Then IFR zone B allows communication between the proxy port for N_Port A 32*a* and the native N_Port B 31*b* of the storage B 1*b* (see dashed line routing path 39*c*). The dashed line routing path 39*b* represents communication between the proxy port for N_Port B 32*b* and the proxy port for N_Port A 32*a* via inter-site connection 7.

When the N_Port A 31*a* issues a FC Frame, the FC router 6*a* adds an encapsulated inter fabric router frame header and the FC router 6*a* changes the FC Frame header to route another fabric B. Then the FC router 6*a* deletes the encapsulated inter fabric router frame header. Then the proxy port for N_Port A 32*a* sends the FC Frame to the N_Port B 31*b* of FC SAN B 2*b*.

Both FC routers 6*a* and 6*b* communicate consistency of the IFR zoning configuration. If an IFR zone is configured at only one site, both FC routers do not propagate IFR zone and both FC routers of any sites do not create proxy ports.

Figure 4:
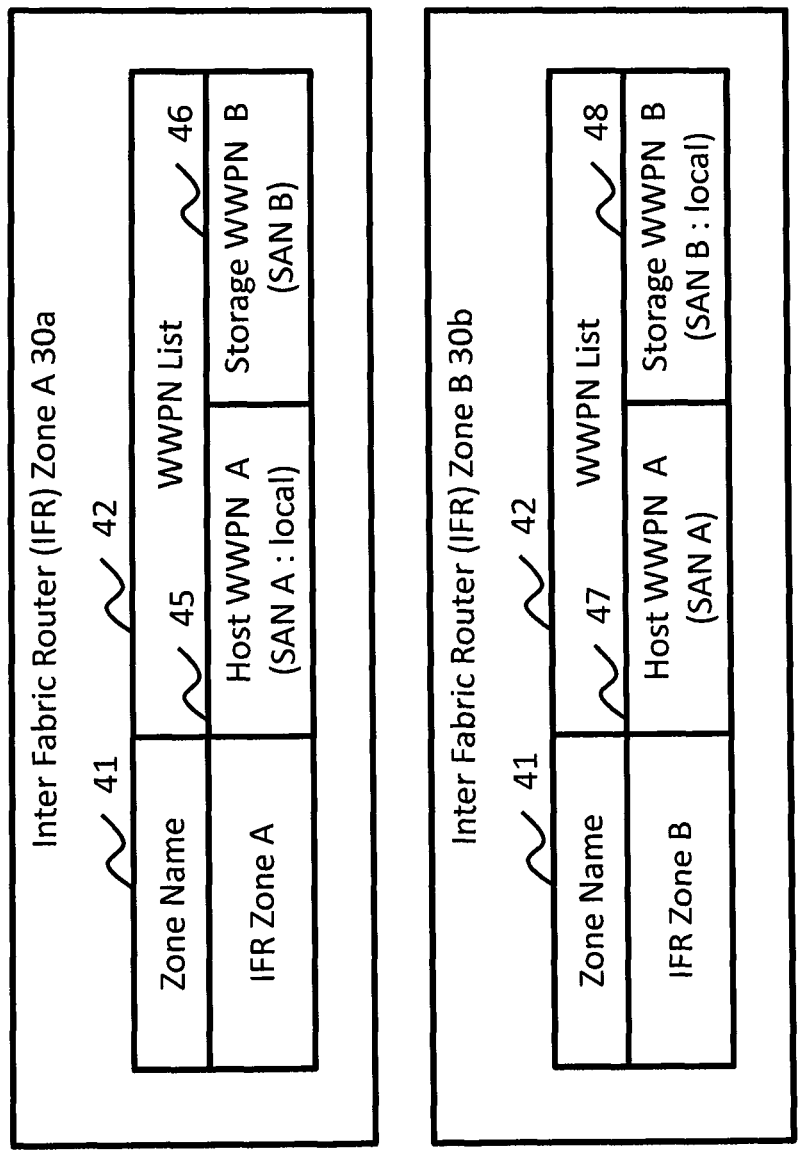
FIG. 4 shows an example of inter fabric router (IFR) zone pair.

FIG. 4 shows an example of inter fabric router (IFR) zone pair 30*a* and 30*b*. The IFR zone A 30*a* contains zone name field 41 and Port ID list 42. A zone name field 41 contains a unique name in the zone database of a SAN fabric. A Port ID list 42 of IFR zone contains one or more local N_Port identifiers and one or more remote N_Port identifiers. A local N_Port (45 and 48) is attached to a local SAN fabric. A remote N_Port (46 and 47) is attached to another remote SAN fabric. An example format of N_Port identifier is 8 bytes World Wide Port Name (WWPN). Each FC router (inter fabric router) has the IFR zone. When both IFR zones of both FC routers are activated, both FC routers create both proxy ports (32*a* and 32*b* in FIG. 3) and enables routing between host port A and storage port B via inter SAN fabric.

First Embodiment

Figure 5:
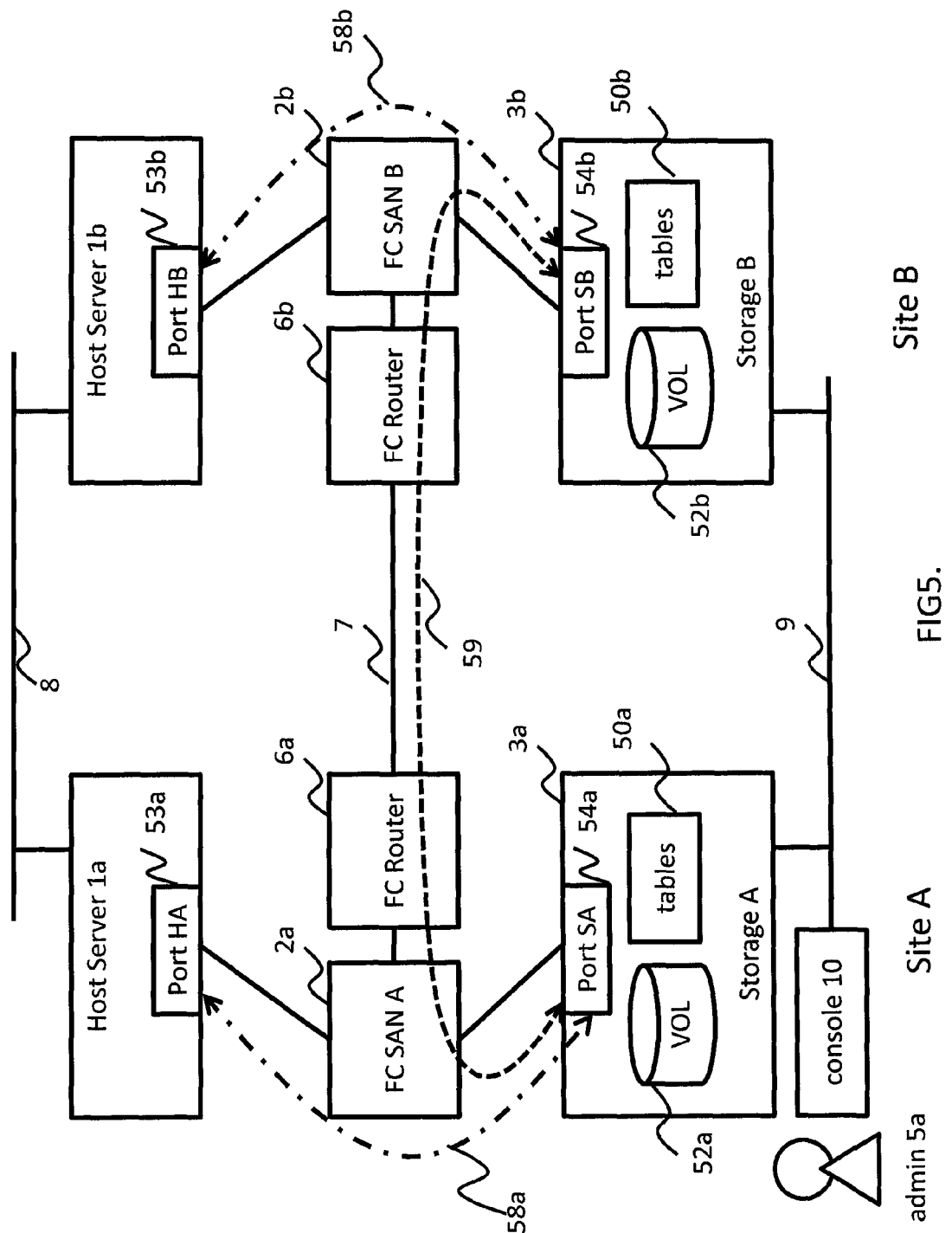
FIG. 5 shows an example environment of automatic configuration of inter fabric routing zoning for each FC router according to a first embodiment of the invention.

FIG. 5 shows an example environment of automatic configuration of inter fabric routing zoning for each FC router according to a first embodiment of the invention. For example, between storage A 3*a* and storage B 3*b* is configured active-active shared volume 52*a*. Each storage 3 copies synchronously. The volumes 52*a* and 52*b* contain the same data.

The environment requires one inter fabric zoning configuration between port SA 54*a* and port SB 54*b* for copy data path (dashed line 59). The host server 1*a* accesses the local volume 52*a*. The environment requires a local SAN zoning configuration between port HA 53*a* and port SA 54*a* (dashed line 58*a*). Also, the host server 1*b* accesses the local volume 52*b*. The environment requires a local SAN zoning configuration between port HB 53*b* and port SB 54*b* (dashed line 58*b*). Each storage 3 has some tables 50. In this embodiment, the tables include volume pair and port configuration table 60 (FIG. 6) and fabric topology table 70 (FIG. 7). The volume pair and port configuration table 60 contains volume pair information for disaster recovery volume or active-active volume, and port information. The fabric topology table 70 contains switches of fabric information and attached N_Port of storage target port, storage communicate initiator port for remote copy, and server host port. Each storage program which contains storage memory creates local zone information or inter fabric routing (IFR) zone information.

FIG. 6 shows an example of a volume pair and port configuration table 60. When an administrator 5 configures remote copy volume for backup, active-active (synchronous copy) volume for or asynchronous copy volume for long distance disaster recovery, and administrator indicate local/remote storage volume ID and port WWPN, the storage program creates the volume pair and port configuration table 60. The table 60 contains copy type field 61, volume ID of local storage 62, port identifier of local storage 63, pair volume ID of remote storage 64, and pair port identifier of remote storage 65. Also, the table 60 contains type of volume field such as primary volume and secondary (backup) volume FIG. 7 shows an example of a fabric topology table 70. The storage program creates the fabric topology table 70 when the storage port logs in to fabric (fabric login process). The table 70 contains N_Port field 71, switch WWN field 72, switch type field 73 and fabric identification field 74. For example, fabric identification field 74 contains 8 Bytes fabric WWN (World Wide Name) or 12 bit F_ID (fabric identifier) which use encapsulated IFR_Header format and assigned F_ID to FC Router uniquely. When the storage issues a fabric login (FLOGI) request, the fabric port (F_Port) returns FLOGI acknowledge (ACC). The FLOGI ACC contains switch WWN (World Wide Name) 72 which is attached F_Port and fabric WWN. Fabric WWN 74 is identifier of a SAN fabric uniquely. Also, the storage program gathers remote server port, remote storage port, and all switch devices in the same SAN. The storage program creates the fabric topology table 70. The table 70 is used to categorize local SAN or remote SAN. A remote SAN has a different fabric WWN. A local SAN has same fabric WWN. The storage knows which fabric is attached by host or storage port using N_Port field 71 and reachability of FC router using switch type field 73. Each storage creates the table 70 and shares the information contained therein with other storages via the management network 9, since a storage program cannot gather remote SAN topology information beyond the FC router.

Figure 8:
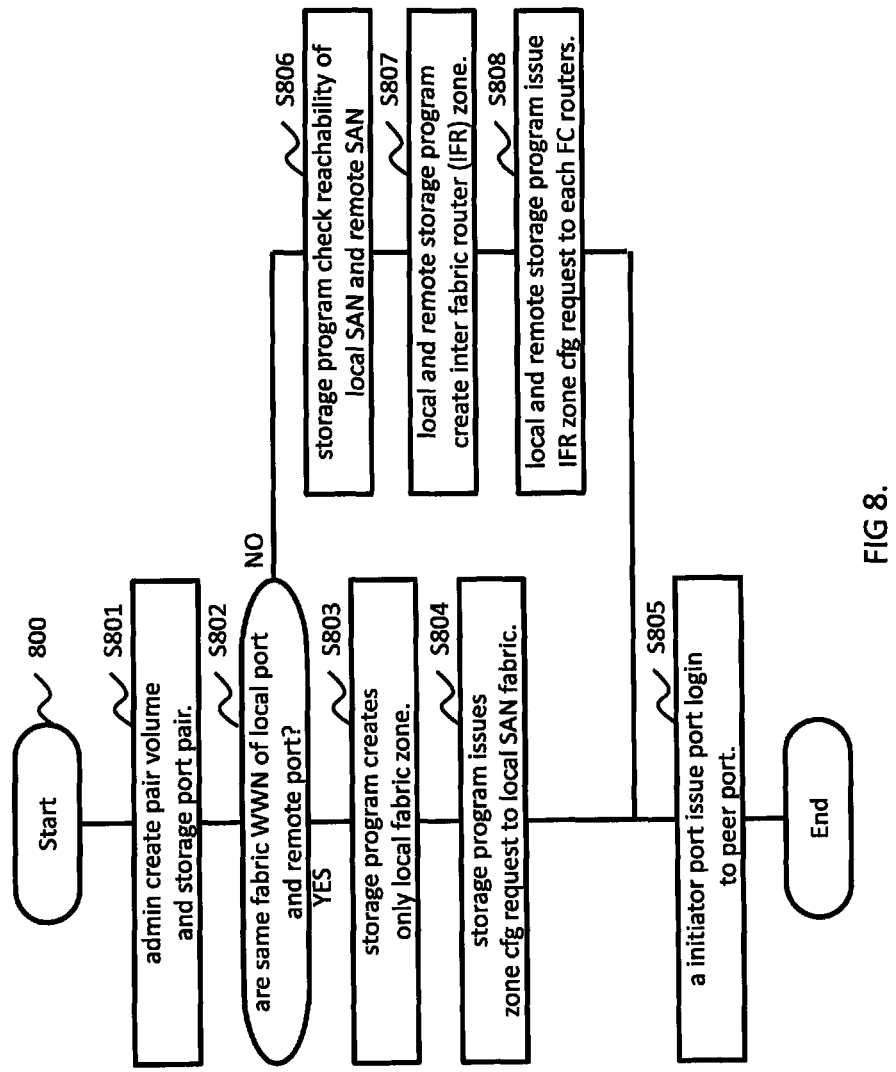
FIG. 8 is a flow diagram illustrating an example of a process to create inter fabric routing zone or local fabric zone for inter storage communication path according to the first embodiment.

FIG. 8 is a flow diagram 800 illustrating an example of a process to create inter fabric routing zone or local fabric zone for inter storage communication path according to the first embodiment. The storage program creates zone information automatically, without coordinate among local SAN administrator and other sites SAN administrators, using the volume pair and port configuration table 60 and fabric topology table 70. The storage program performs the flow for all portions/segments of the required path of dashed line 59 (FIG. 5).

In step S801, the administrator of the local site creates a pair volume such as disaster recovery volume configuration, an active-active volume configuration, or a migration configuration. Then the administrator chooses a storage port pair of local storage and remote storage. In step S802, the storage program of the local storage checks the fabric topology table 70. The storage program compares the fabric WWN of the local port and the fabric WWN of the remote port. If these fabric WWNs are the same (YES), then the process proceeds to step S803. If these fabric WWNs are different (NO), a SAN fabric attached to the local port of local storage is different from a SAN fabric attached to the remote port of remote storage, and the next step is S806.

In step S803, the storage program of local storage creates a local fabric zone. The local fabric zone accepts connection of the local port of local storage and the remote port of remote storage in the same local SAN. In step S804, the storage program of the local storage issues a zone configuration request to the local SAN fabric. When the zone configuration is activated, the local port of local storage can communicate with the remote port of remote storage. In step S805, the initiator port of local storage or remote storage issues a port login (PLOGI) to peer port of remote storage or local storage.

In step S806, both storage programs of the local and remote ports check reachability between a FC router attached to the local SAN and a FC router attached to the remote SAN using the fabric topology table 70. If there is no reachability between these FC routers, the configuration of the storage port pair which is configured by the administrator in step S801 is an invalid configuration, and then the storage program notifies the alert to the administrator and the process ends. In step S807, both storage programs of the local and remote ports create inter fabric router (IFR) zones in their respective SAN fabrics. The two IFR zones accept connection of the local port of local storage which is attached to the local SAN fabric and the remote port of remote storage which is attached to the remote SAN fabric via the FC routers. In step S808, both storage programs of the local and remote ports issue IFR zone configuration requests to their respective FC routers which are attached to the local SAN and remote SAN, respectively. When both FC routers that are attached to the local SAN and remote SAN, respectively, activate their respective IFR zones, these FC routers create respective proxy ports to export local port of the local storage and remote port of remote storage to the SAN fabric of the other storage respectively (i.e., to export the local port of local storage to the SAN fabric of the remote storage and to export the remote port of remote storage to the SAN fabric of the local storage, respectively). Then, the local port of local storage can communicate with the proxy port of the remote port of remote storage via the local FC router, and the remote port of remote storage can communicate with the proxy port of the local port of local storage via the remote FC router. In the next step S805, the initiator port of local storage or remote storage issues a port login (PLOGI) to peer port of remote storage or local storage. The process of the flow diagram 800 can be performed by the host hypervisor program or management client which has server and storage configurations.

Figure 9:
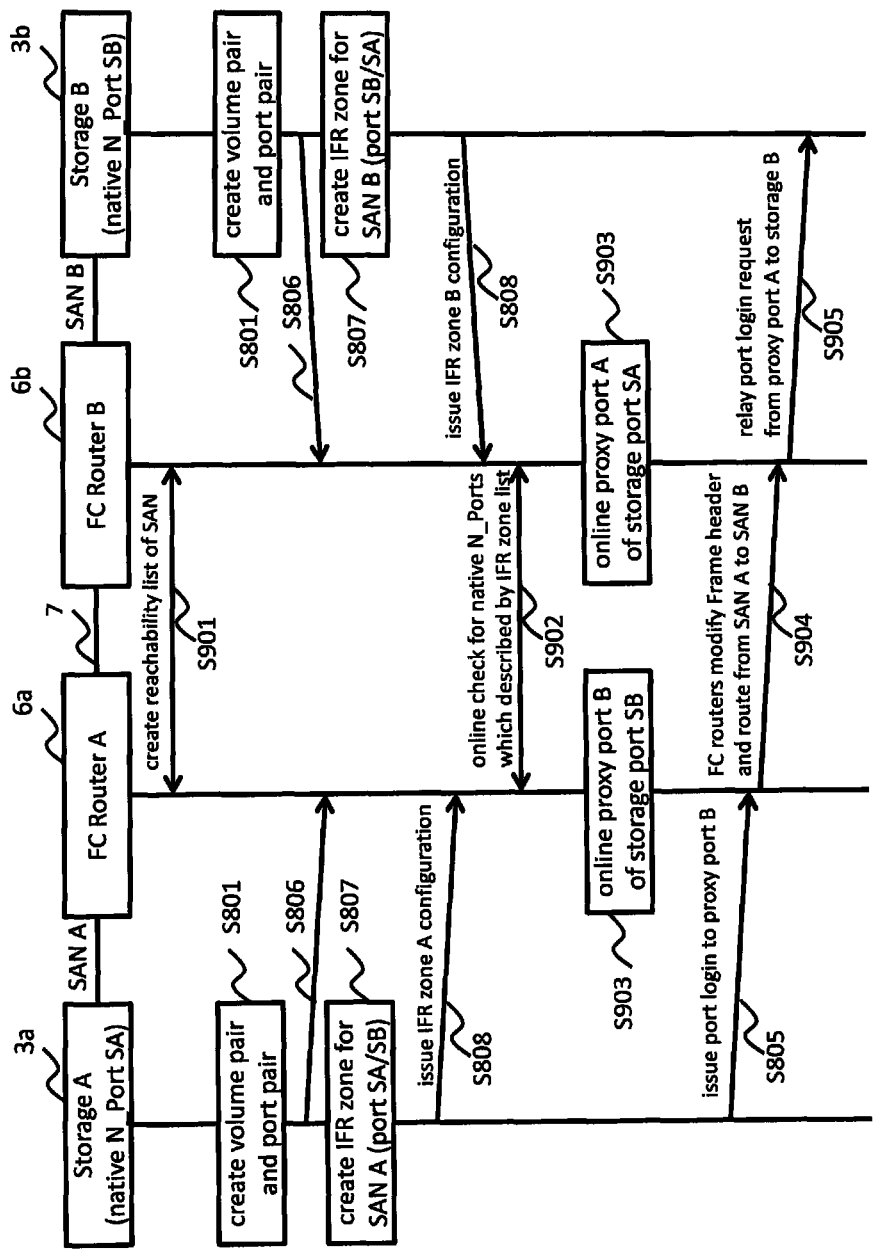
FIG. 9 shows an example of a ladder chart of zoning propagation between inter fabric router (IFR) zone according to the first embodiment.

FIG. 9 shows an example of a ladder chart of zoning propagation between inter fabric router (IFR) zone according to the first embodiment. FIG. 9 is related to flow chart 800 of FIG. 8. In step S901, when the FC routers connection 7 is established, both FC routers exchange reachability list of SAN. FC router A knows the reachability of SAN B via FC routing. The storage program of the storage at each site gets the reachability list of the other SAN fabric at the other site to check reachability in advance (S806). In step S902, when the IFR zones are activated by both FC routers (S808), the FC routers 6a and 6b check online or offline status of native N_Ports which are described by the IFR zone list. In this example, the native N_Port is storage port SA for storage A 3a and storage port SB for storage B 3b. In step S903, when the FC routers complete checking both native N_Ports of storage A and storage B with online status, FC router A exports proxy port B for native N_Port of storage B and online proxy port B, and FC router B exports proxy port A for native N_Port of storage A and online proxy port A. In this way, communication is established between storage A and storage B. In step S904, when storage A which has the initiator port issues a port login (PLOGIN) to proxy port B (routing path 39a in FIG. 3), FC router A 6a adds an encapsulated additional IFR header to the FC frame, and then FC router A is routing to FC router B which is attached to the native N_Port SB which is related to the proxy port B (routing path 39b in FIG. 3). In step S905, FC router B removes the IFR header, and proxy port A of FC router B relay frame to the native N_Port SB of storage B is provided as a relay port login request from proxy port A to storage B (routing path 39c in FIG. 3). The PLOGI reply frame routing scheme is the same as the reverse direction of S904 and S905. Also, normal SCSI (Small Computer System Interface) 10 (Input/Output) frame routing flow is the same as the routing scheme which is described in steps S904 and S905.

Second Embodiment

Figure 10:
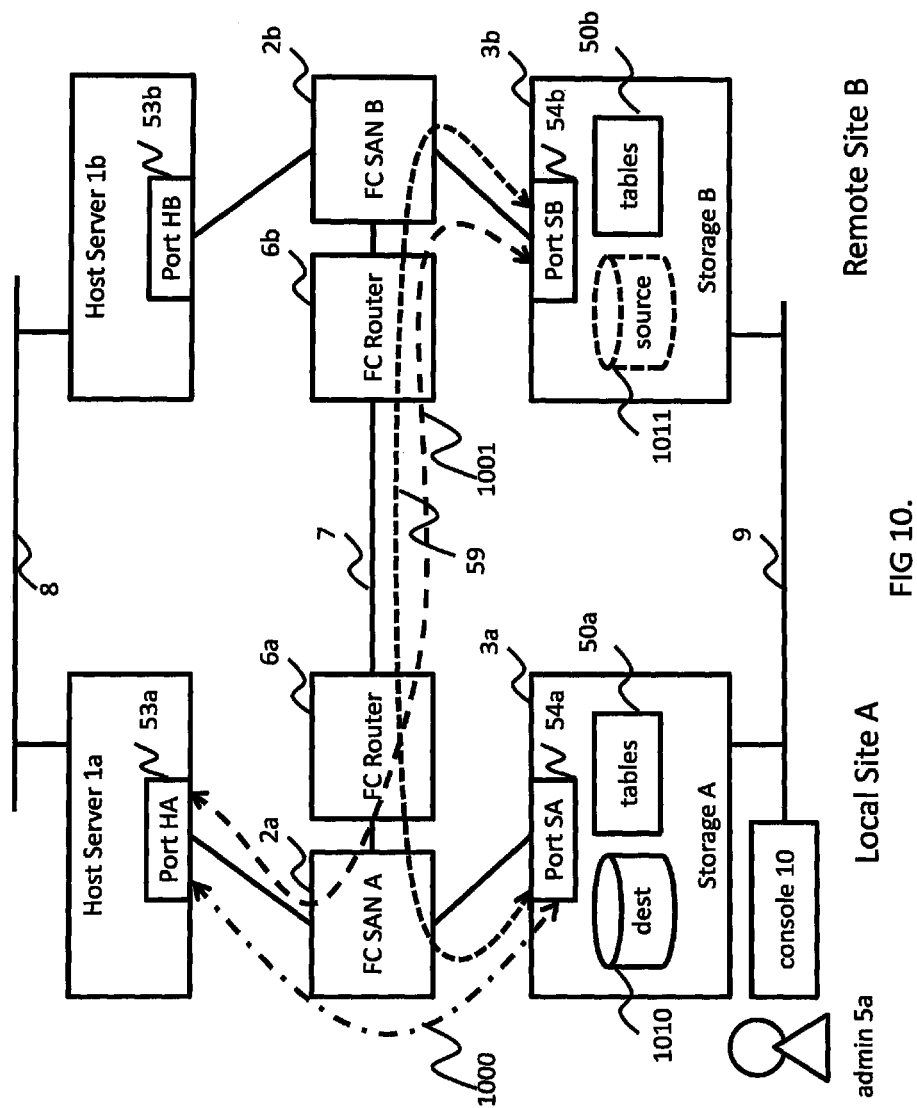
FIG. 10 shows an example environment of automatic configuration of inter fabric routing zoning for each FC router according to a second embodiment of the invention.

FIG. 10 shows an example environment of automatic configuration of inter fabric routing zoning for each FC router according to a second embodiment of the invention. For example, between storage A 3a and storage B 3b is configured a migration volume pair 1010 and 1011. Each storage copies data to migrate volume from source volume 1011 to destination volume 1010. The environment is required an inter fabric router (IFR) zoning configuration between port SA 54a and port SB 54b for migration data path (dashed line 59). The host server 1a accesses the destination volume 1010. The environment requires a local SAN zoning configuration between port HA 53a and port SA 54a (dashed line 1000). Also, the host server 1b accesses source volume 1011. The environment requires an IFR zoning configuration between port HA 53a and port SB 54b (dashed line 1001).

FIG. 11 shows an example of a host group table 110. When the administrator 5 configures volume and access host port, a storage program creates the host group table 110 and stores it to the storage memory in the storage. The table 110 contains host WWPN field 1101, volume ID field 1102, and storage WWPN field 1103.

Figure 12:
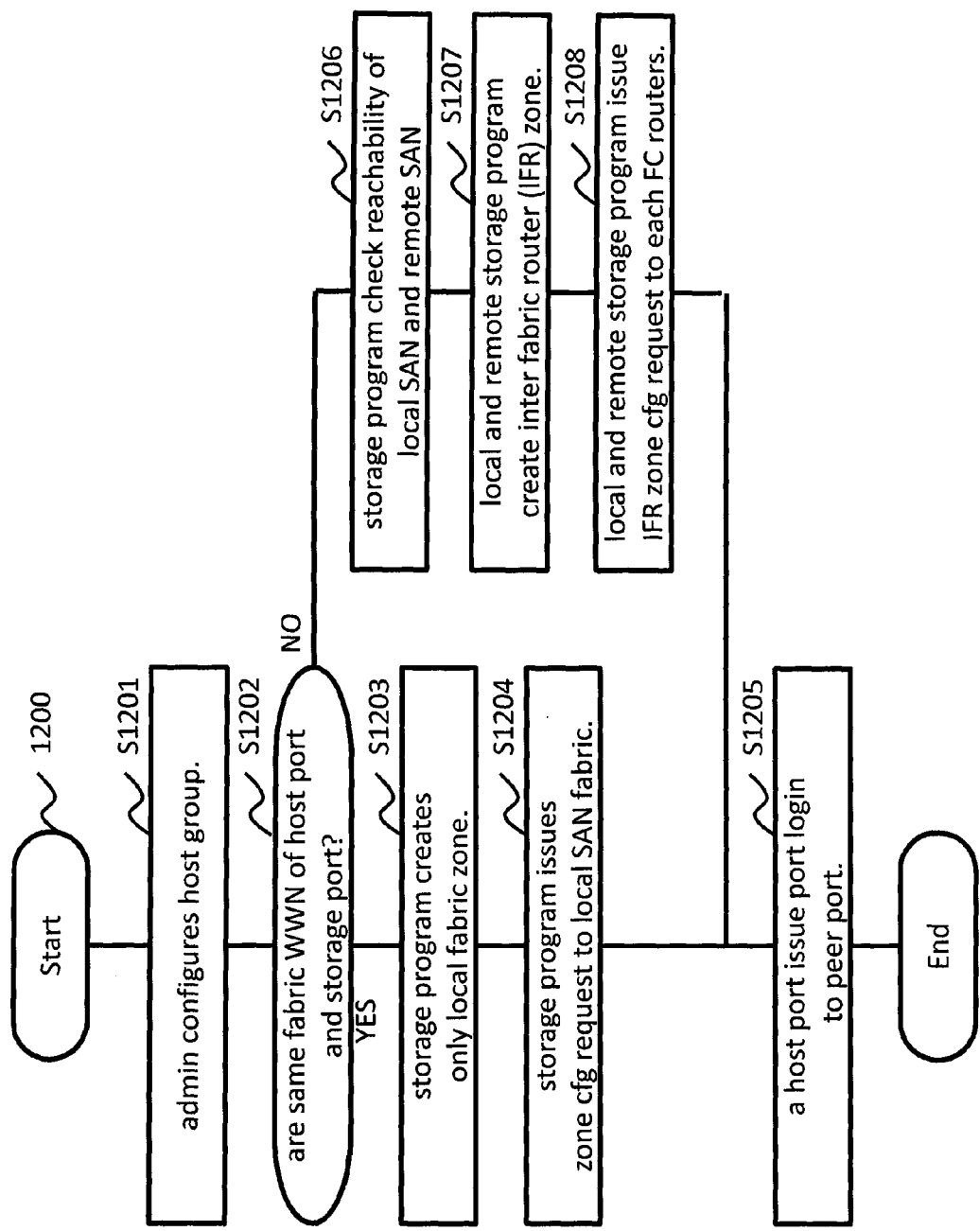
FIG. 12 is a flow diagram illustrating an example of a process to create inter fabric routing zone or local fabric zone for host to storage path according to the second embodiment.

FIG. 12 is a flow diagram 1200 illustrating an example of a process to create inter fabric routing zone or local fabric zone for host to storage path according to the second embodiment. The storage program creates zone information automatically, without coordinate among local SAN administrator and SAN administrators at other sites, using the volume pair and port configuration table 60, fabric topology table 70, and host group table 110. The storage program performs the flow for all portions/segments of the required path of dashed line 59 (FIG. 5, also shown in FIG. 10), or dashed lines 1000 and 1001 (FIG. 10). Many of the steps in the flow diagram 1200 of FIG. 12 are similar to those of FIG. 8.

In step S1201, the administrator of the local site configures host group information. In step S1202, the storage program of the local storage checks the fabric topology table 70. The storage program compares the fabric WWN of the host port and the fabric WWN of the storage port and checks the location of the SAN fabrics. If these fabric WWNs are same (YES), then the process proceeds to step S1204. If these fabric WWNs are different (NO), a SAN fabric attached host port of local SAN is different from a SAN fabric attached storage port of remote SAN, and the next step is S1206.

In step S1203, the storage program of a local storage which has the volume creates a local fabric zone. The local fabric zone accepts connection of local storage port of local storage and host port of local host which are attached to the same SAN. In step S1204, the storage program of the local storage issues a zone configuration request to the local SAN fabric. When the zone configuration is activated, the local port of local storage can communicate with the host port of local host. In step S1205, the host port of local host issues a port login (PLOGI) to the storage target port which has the volume.

In step S1206, both storage programs of local storage which is attached to the same SAN as the host port and of remote storage which has the volume check reachability between a FC router attached to local SAN and a FC router attached to remote SAN using the fabric topology table 70. If there is no reachability between these FC routers, the host group configuration (see host group table 110) of host port and storage port pair which is configured by the administrator in step S1201 is an invalid configuration, and the storage program notifies the alert to the administrator and the process ends. In step S1207, both storage programs of local storage and remote storage create inter fabric router (IFR) zones in their respective SAN fabrics to communicate with the host port HA 53*a* which is attached to the same SAN as the local storage 3*a* and with the storage port SB 54*b* of the remote storage 3*b*. The two IFR zones accept connection of the local host port 53*a* of the host which is attached to the local SAN fabric and the storage port 54*b* of remote storage which is attached to the remote SAN fabric via FC routers. In step S1208, both storage programs of local and remote ports issue IFR zone configuration requests to their respective FC routers which are attached to the local SAN and remote SAN, respectively. When both FC routers that are attached to the local SAN and remote SAN activate their respective IFR zones, these FC routers create respective proxy ports to export local host port of local host and remote storage port of remote storage to the SAN fabric of the other, respectively (i.e., to export the local host port of local host to the SAN fabric of the remote storage and to export the remote storage port of remote storage to the SAN fabric of the local host). Then, the local port of local host can communicate with the proxy port of remote port of remote storage via the FC routers. In the next step S1205, the host port of local host issues a port login (PLOGI) to the storage target port which has the volume. The process of the flow diagram 1200 can be performed by the host hypervisor program or management client which has server and storage configurations.

Figure 13:
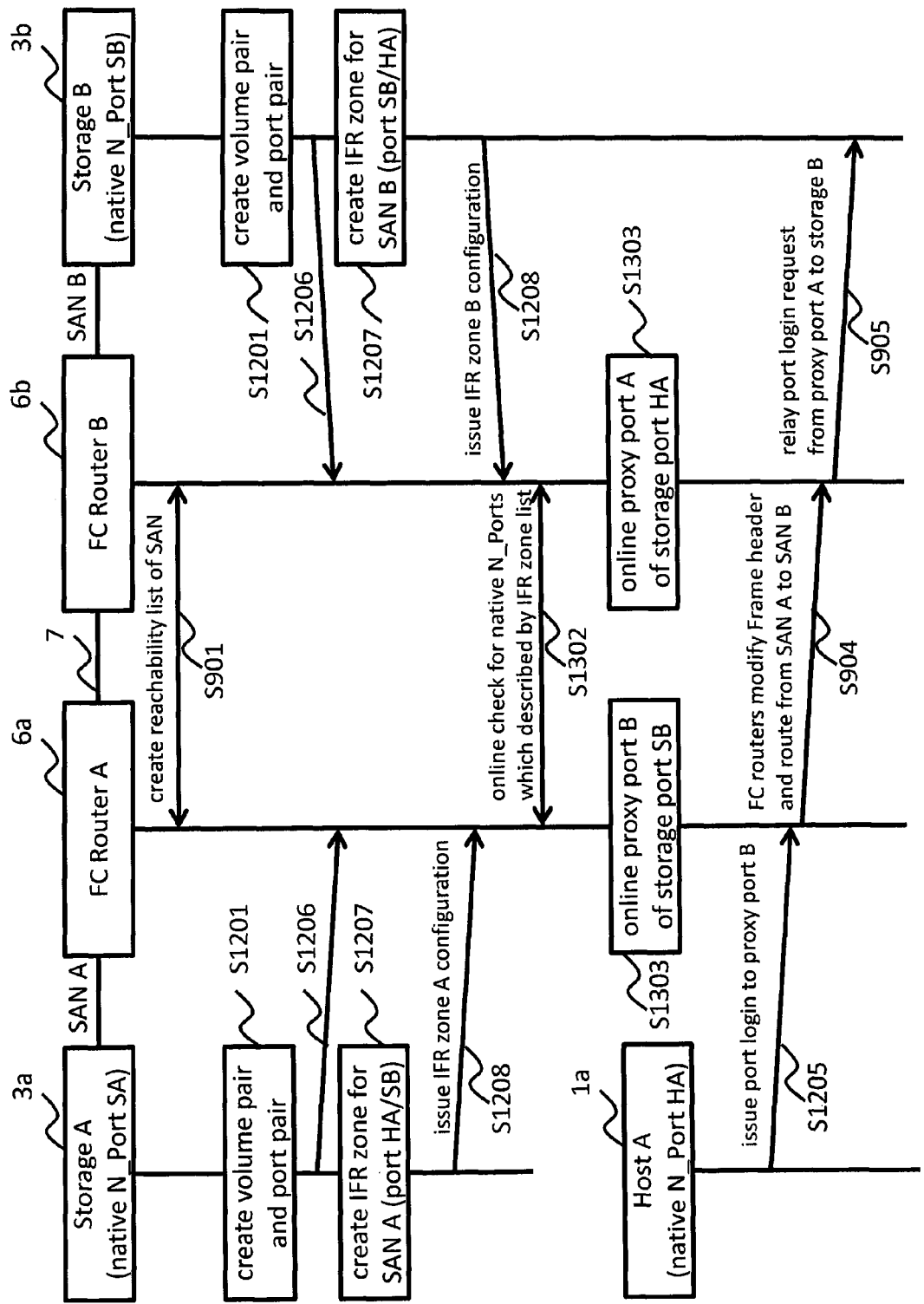
FIG. 13 shows an example of a ladder chart of zoning propagation between inter fabric router (IFR) zone according to the second embodiment.

FIG. 13 shows an example of a ladder chart of zoning propagation between inter fabric router (IFR) zone according to the second embodiment. FIG. 13 is related to flow chart 1200 of FIG. 12. Many of the steps in the ladder chart of FIG. 13 are similar to those of FIG. 9. In step S1302, when IFR zones are activated by both FC routers (S1208), the FC routers 6*a* and 6*b* check online or offline status of native N Ports which are described by IFR zone list. In this example, the native N_Port is host port HA for host 1*a* and storage port SB for storage B 3*b*. In step S1303, when the FC routers complete checking both native N_Ports of host port HA and storage port SB with online status, FC router A exports proxy port B for native N_Port of storage port SB and online proxy port B, and FC router B exports proxy port A for native N_Port of host port HA and online proxy port A. In this way, communication is established between host port HA and storage port SB.

Third Embodiment

Figure 14:
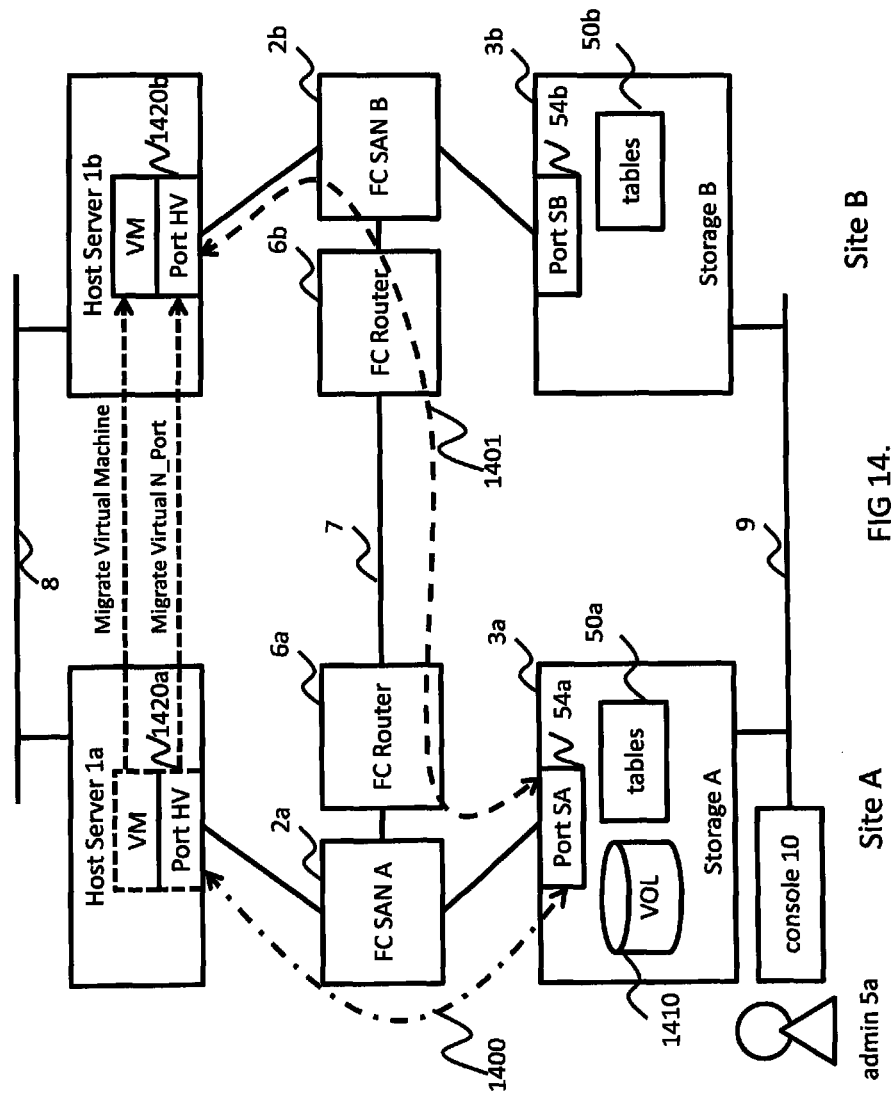
FIG. 14 shows an example environment of automatic configuration of inter fabric routing zoning for each FC router for host virtual machine migration according to a third embodiment of the invention.

FIG. 14 shows an example environment of automatic configuration of inter fabric routing zoning for each FC router for host virtual machine migration according to a third embodiment of the invention. For example, between host server 1*a* and host server 1*b* is configured a host virtual machine migration. The storage A 3*a* has volume 1410. The environment requires an inter fabric router (IFR) zoning configuration between port SA 54*a* and host virtual port HV 1420*b* which has a path that is a virtual machine migration path (dashed line 1401). The host server 1*a* accesses the local volume 1410. The environment requires a local SAN zoning configuration between virtual port HV 1420*a* and port SA 54*a* (dashed line 1400). The virtual N_Ports 1420*a* and 1420*b* in the two host servers 1*a* and 1*b* have the same WWPN. When the virtual machine is migrated from host server 1*a* to host server 1*b*, the previous virtual N_Port 1420*a* is logged out from the local SAN fabric A 2*a*. The whole network of multiple SANs 2*a* and 2*b* which is connected via FC routers does not accept duplicate WWPN fabric login. Each storage program which contains storage memory creates local zone information or inter fabric routing (IFR) zone information.

FIG. 15 shows an example of a host cluster table 150. The host cluster table 150 has cluster ID field 1501, physical port WWPNs list of physical servers 1502, and virtual WWPNs list of virtual machine 1503. The table 150 indicates mobility region of host virtual ports. For example, a virtual port VM port 1 which is shown in the virtual WWPN list field 1503 can be moved between host ports HA and HB which are shown in the physical port WWPNs list field 1502 since they have the same cluster ID 1. When the virtual port VM port 1 is migrated from physical server A to physical server B, the host is changed by moving the entry of VM port 1 from Host port HA to Host port HB of physical server B entry (arrow 1504).

Figure 16:
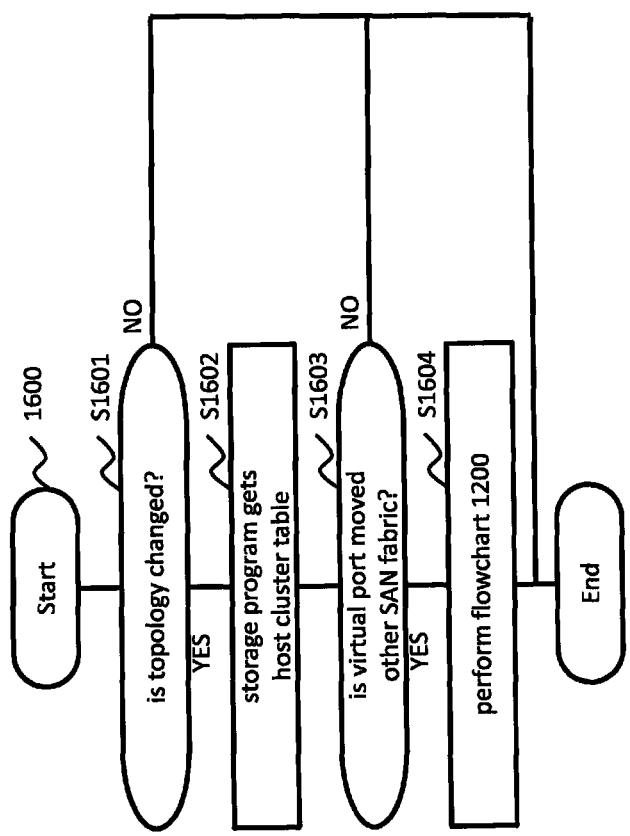
FIG. 16 is a flow diagram illustrating an example of a process to create inter fabric routing zone or local fabric zone for host to storage path when host virtual machine is migrated according to the third embodiment.

FIG. 16 is a flow diagram 1600 illustrating an example of a process to create inter fabric routing zone or local fabric zone for host to storage path when host virtual machine is migrated according to the third embodiment. In step S1601, when host virtual machine is migrated, the virtual N_Port which is associated with the virtual machine is moved to a host attached to the same SAN fabric or another SAN fabric. The virtual N_Port is "logout"-ed or "login"-ed, and the SAN fabric topology is changed in an existing zone. A storage program which is associated with the virtual port of the host virtual machine detects a topology change (YES), and the next step is S1602. When virtual machine migration is not performed, the topology is not changed (NO), and the process ends. In step S1602, the storage program gets information contained in the host cluster table 150. The storage program identifies the virtual port of the virtual machine which is moved to another physical N_Port of another physical server. Then the storage program of the local or remote storage updates the fabric topology table 70.

In step S1603, the storage of local or remote port discovers the moved virtual port. When virtual machine is moved in the same SAN fabric (NO), then a new fabric zone is not required, and the process ends. When virtual machine is moved out of the same SAN fabric to another SAN fabric (YES), the storage program deletes the existing local zone in the same SAN and creates a new IFR zone among the same SAN fabric and the other SAN fabric to which the moved virtual port is attached. The next step is S1604. In step S1604, the storage programs of the local and remote storage create IFR zone to communicate between the moved virtual port of virtual machine which moved to the remote physical host and the storage port of local storage. For example, the process of the flow diagram 1200 in FIG. 12 is performed. The process of the flow diagram 1600 can be performed by the host hypervisor program or management client which has server and storage configurations.

The processes described above (e.g., FIGS. 8, 12, and 16) may be performed by a storage program in a storage system. Alternatively, they may be performed by a controller or processor of a management computer which is separate from the host computers and storage systems but is coupled with the host computers and storage systems via network connections.

Of course, the system configurations illustrated in FIGS. 5, 10, and 14 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for automation of storage network configuration. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer comprising a memory, and a controller operable to:
manage, using the memory, a first relationship among a plurality of ports of Fibre Channel (FC) protocol and a volume used to store data to be sent via the plurality of ports, and a second relationship between each of the ports and a fabric identification of a fabric topology;
manage the plurality of ports for creating a same fabric zone if the plurality of ports correspond to the same fabric identification based on the second relationship; and
if the plurality of ports do not correspond to the same fabric identification based on the second relationship, manage (1) a first port of the plurality of ports as a first proxy port in a second fabric zone and (2) a second port of the plurality of ports as a second proxy port in a first fabric zone, for interconnecting the first fabric zone and the second fabric zone, the first port corresponding to a first fabric identification of a first fabric, the second port corresponding to a second fabric identification of a second fabric, and create a first inter fabric router zone as the first fabric zone in the first fabric, the first inter fabric router zone allowing communication between the second proxy port and the first port, the second proxy port communicating with the first proxy port via a connection between a first FC router of the first fabric and a second FC router of the second fabric.

2. The computer according to claim 1,
wherein, if the plurality of ports correspond to the same fabric identification, the controller is operable to manage the plurality of ports for creating the same fabric zone, for access to the volume, based on the first and second relationships; and
wherein, if the plurality of ports do not correspond to the same fabric identification, the controller is operable to manage (1) the first port and (2) the second port, for interconnecting the first fabric zone and the second fabric zone, for access to the volume, based on the first and second relationships.

3. The computer according to claim 1,
wherein the controller is operable to create a second inter fabric router zone as the second fabric zone in the second fabric, the second inter fabric router zone allowing communication between the first proxy port and the second port.

4. The computer according to claim 3,
wherein the first port is a port of a first storage system;
wherein the second port is a port of a second storage system; and
wherein the controller is operable to manage (1) the first port and (2) the second port, for interconnecting the first fabric zone and the second fabric zone, for access to the volume, based on the first and second relationships.

5. The computer according to claim 3,
wherein the first port is a port of a storage system;
wherein the second port is a port of a host computer; and
wherein the controller is operable to:
manage, using the memory, a third relationship between the volume and at least one port of a host computer for accessing the volume; and
manage (1) the first port and (2) the second port, for interconnecting the first fabric zone and the second fabric zone, for access to the volume, based on the first, second, and third relationships.

6. The computer according to claim 1,
wherein the first port is a port of a first storage system;
wherein the second port is a virtual machine port of a virtual machine;
wherein the controller is operable to manage, using the memory, a third relationship between physical WWPNs of (World Wide Port Names) of host computers, cluster identifier of the host computers, and virtual WWPNs of virtual machines in the host computers, and to determine, based on the third relationship, whether the virtual machine has migrated from a first host computer having a port corresponding to the first fabric identification of the first fabric to a second host computer;

wherein, if the virtual machine has migrated to the second host computer and if the first and second ports correspond to the same fabric identification, the controller is operable to manage the first and second ports for creating the same fabric zone, for access to the volume, based on the first and second relationships; and wherein, if the virtual machine has migrated to the second host computer and if the first and second ports do not correspond to the same fabric identification, the controller is operable to manage (1) the first port and (2) the second port, for interconnecting the first fabric zone and the second fabric zone, for access to the volume, based on the first and second relationships.

7. The computer according to claim 6, wherein the virtual machine has migrated from the first host computer to the second host computer, and the second port corresponds to a second fabric identification of a second fabric after migration of the virtual machine;

wherein if the computer is a management computer, the controller is operable to create a first inter fabric router zone in the first fabric and a second inter fabric router zone in the second fabric, the first inter fabric router zone allowing communication between the second proxy port and the first port, the second inter fabric router zone allowing communication between the first proxy port and the second port, the second proxy port communicating with the first proxy port via a connection between a first FC router of the first fabric and a second FC router of the second fabric; and wherein if the first storage system comprises the computer, the controller is operable to create a first inter fabric router zone in the first fabric, the first inter fabric router zone allowing communication between the second proxy port and the first port, the second proxy port communicating with the first proxy port via a connection between a first FC router of the first fabric and a second FC router of the second fabric.

8. A system comprising:

a computer including a memory and a controller; and a plurality of subsystems having a plurality of ports of Fibre Channel (FC) protocol and a volume used to store data to be sent via the plurality of ports;

wherein the controller is operable to:

manage, using the memory, a first relationship among the plurality of ports and the volume, and a second relationship between each of the ports and a fabric identification of a fabric topology;

manage the plurality of ports for creating a same fabric zone if the plurality of ports correspond to the same fabric identification based on the second relationship; and if the plurality of ports do not correspond to the same fabric identification based on the second relationship, manage (1) a first port of the plurality of ports as a first proxy port in a second fabric zone and (2) a second port of the plurality of ports as a second proxy port in a first fabric zone, for interconnecting the first fabric zone and the second fabric zone, the first port corresponding to a first fabric identification of a first fabric, the second port corresponding to a second fabric identification of a second fabric, and create a first inter fabric router zone as the first fabric zone in the first fabric, the first inter fabric router zone allowing communication between the second proxy port and the first port, the second proxy port communicating with the first proxy port via a connection between a first FC router of the first fabric and a second FC router of the second fabric.

9. The system according to claim 8, wherein, if the plurality of ports correspond to the same fabric identification, the controller is operable to manage the plurality of ports for creating the same fabric zone, for access to the volume, based on the first and second relationships; and wherein, if the plurality of ports do not correspond to the same fabric identification, the controller is operable to manage (1) the first port and (2) the second port, for interconnecting the first fabric zone and the second fabric zone, for access to the volume, based on the first and second relationships.

10. The system according to claim 8, wherein the controller is operable to create a second inter fabric router zone as the second fabric zone in the second fabric, the second inter fabric router zone allowing communication between the first proxy port and the second port.

11. The system according to claim 10, wherein the first port is a port of a first storage system;

wherein the second port is a port of a second storage system;

wherein the controller is operable to manage (1) the first port and (2) the second port, for interconnecting the first fabric zone and the second fabric zone, for access to the volume, based on the first and second relationships;

wherein the first storage system includes a first computer having one memory as a first memory and one controller as a first controller; and wherein the second storage system includes a second computer having another memory as a second memory and another controller as a second controller.

12. The system according to claim 10, wherein the first port is a port of a first storage system;

wherein the second port is a port of a second host computer;

wherein the controller is operable to:

manage, using the memory, a third relationship between the volume and at least one port of a host computer for accessing the volume; and manage (1) the first port and (2) the second port, for interconnecting the first fabric zone and the second fabric zone, for access to the volume, based on the first, second, and third relationships;

wherein the first storage system includes a first computer having one memory as a first memory and one controller as a first controller; and wherein the system further comprises a second storage system which includes a second computer having another memory as a second memory and another controller as a second controller, the second storage system having a port which corresponds to the second fabric identification of the second fabric.

13. The system according to claim 8, wherein the first port is a port of a first storage system;

wherein the second port is a virtual machine port of a virtual machine;

wherein the controller is operable to manage, using the memory, a third relationship between physical WWPNs of (World Wide Port Names) of host computers, cluster identifier of the host computers, and virtual WWPNs of virtual machines in the host computers, and to determine, based on the third relationship, whether the virtual machine has migrated from a first host computer having a port corresponding to the first fabric identification of the first fabric to a second host computer;

wherein, if the virtual machine has migrated to the second host computer and if the first and second ports correspond to the same fabric WWN, the controller is operable to manage the first and second ports for creating the same fabric zone, for access to the volume, based on the first and second relationships; and wherein, if the virtual machine has migrated to the second host computer and if the first and second ports do not correspond to the same fabric identification, the controller is operable to manage (1) the first port and (2) the second port, for interconnecting the first fabric zone and the second fabric zone, for access to the volume, based on the first and second relationships.

14. The system according to claim 13, wherein the virtual machine has migrated from the first host computer to the second host computer, and the second port corresponds to a second fabric identification of a second fabric after migration of the virtual machine;

wherein the computer is a management computer, and the controller is operable to create a first inter fabric router zone in the first fabric and a second inter fabric router zone in the second fabric, the first inter fabric router zone allowing communication between the second proxy port and the first port, the second inter fabric router zone allowing communication between the first proxy port and the second port, the second proxy port communicating with the first proxy port via a connection between a first FC router of the first fabric and a second FC router of the second fabric.

15. The system according to claim 8, wherein the virtual machine has migrated from the first host computer to the second host computer, and the second port corresponds to a second fabric WWN of a second fabric after migration of the virtual machine;

wherein the first storage system includes a first computer having one memory as a first memory and one controller as a first controller;

wherein the subsystems comprise a second storage system which includes a second computer having another memory as a second memory and another controller as a second controller, the second storage system having a port which corresponds to the second fabric identification of the second fabric;

wherein the first controller is operable to create a first inter fabric router zone in the first fabric, the first inter fabric router zone allowing communication between the second proxy port and the first port, the second proxy port communicating with the first proxy port via a connection between a first FC router of the first fabric and a second FC router of the second fabric; and wherein the first controller is operable to create a second inter fabric router zone in the second fabric, the second inter fabric router zone allowing communication between the first proxy port and the second port.

16. A non-transitory computer-readable storage medium storing a plurality of instructions for controlling a data processor to manage network configuration, the plurality of instructions comprising:

instructions that cause the data processor to manage, using the memory, a first relationship among a plurality of ports of Fibre Channel (FC) protocol and a volume used to store data to be sent via the plurality of ports, and a second relationship between each of the ports and a fabric identification of a fabric topology;

instructions that cause the data processor to manage the plurality of ports for creating a same fabric zone if the plurality of ports correspond to the same fabric identification based on the second relationship; and instructions that cause the data processor, if the plurality of ports do not correspond to the same fabric identification based on the second relationship, to manage (1) a first port of the plurality of ports as a first proxy port in a second fabric zone and (2) a second port of the plurality of ports as a second proxy port in a first fabric zone, for interconnecting the first fabric zone and the second fabric zone, the first port corresponding to a first fabric identification of a first fabric, the second port corresponding to a second fabric identification of a second fabric, and create a first inter fabric router zone as the first fabric zone in the first fabric, the first inter fabric router zone allowing communication between the second proxy port and the first port, the second proxy port communicating with the first proxy port via a connection between a first FC router of the first fabric and a second FC router of the second fabric.

17. The non-transitory computer-readable storage medium according to claim 16, wherein the plurality of instructions comprise:

if the plurality of ports correspond to the same fabric identification, instructions that cause the data processor to manage the plurality of ports for creating the same fabric zone, for access to the volume, based on the first and second relationships; and if the plurality of ports do not correspond to the same fabric identification, instructions that cause the data processor to manage (1) the first port and (2) the second port, for interconnecting the first fabric zone and the second fabric zone, for access to the volume, based on the first and second relationships.

18. The non-transitory computer-readable storage medium according to claim 16, wherein the plurality of instructions comprise instructions that cause the data processor to create a second inter fabric router zone as the second fabric zone in the second fabric, the second inter fabric router zone allowing communication between the first proxy port and the second port.

19. The non-transitory computer-readable storage medium according to claim 16, wherein the first port is a port of a first storage system and corresponds to a first fabric identification of a first fabric;

wherein the second port is a virtual machine port of a virtual machine;

wherein the plurality of instructions comprise instructions that cause the data processor to manage, using the memory, a third relationship between physical WWPNs of (World Wide Port Names) of host computers, cluster identifier of the host computers, and virtual WWPNs of virtual machines in the host computers, and to determine, based on the third relationship, whether the virtual machine has migrated from a first host computer having a port corresponding to the first fabric identification of the first fabric to a second host computer;

wherein, if the virtual machine has migrated to the second host computer and if the first and second ports correspond to the same fabric identification, the plurality of instructions comprise instructions that cause the data processor to manage the first and second ports for creating the same fabric zone, for access to the volume, based on the first and second relationships; and wherein, if the virtual machine has migrated to the second host computer and if the first and second ports do not correspond to the same fabric identification, the plurality of instructions comprise instructions that cause the data processor to manage (1) the first port and (2) the second port, for interconnecting the first fabric zone and the second fabric zone, for access to the volume, based on the first and second relationships.

20. The non-transitory computer-readable storage medium according to claim 19, wherein the virtual machine has migrated from the first host computer to the second host computer, and the second port corresponds to a second fabric identification of a second fabric after migration of the virtual machine;

wherein if the computer is a management computer, the plurality of instructions comprise instructions that cause the data processor to create a first inter fabric router zone in the first fabric and a second inter fabric router zone in the second fabric, the first inter fabric router zone allowing communication between the second proxy port and the first port, the second inter fabric router zone allowing communication between the first proxy port and the second port, the second proxy port communicating with the first proxy port via a connection between a first FC router of the first fabric and a second FC router of the second fabric; and wherein if the first storage system comprises the computer, the plurality of instructions comprise instructions that cause the data processor to create a first inter fabric router zone in the first fabric, the first inter fabric router zone allowing communication between the second proxy port and the first port, the second proxy port communicating with the first proxy port via a connection between a first FC router of the first fabric and a second FC router of the second fabric.

* * * * *